United States Patent
Ito et al.

(10) Patent No.: US 12,300,071 B2
(45) Date of Patent: May 13, 2025

(54) GAME DEVICE, GAME CONTROL METHOD, AND RECORDING MEDIUM

(71) Applicant: SEGA SAMMY CREATION INC., Tokyo (JP)

(72) Inventors: Masato Ito, Tokyo (JP); Seiji Kato, Tokyo (JP)

(73) Assignee: SEGA SAMMY CREATION INC., Tokyo (JP)

( * ) Notice: Subject to any disclaimer, the term of this patent is extended or adjusted under 35 U.S.C. 154(b) by 278 days.

(21) Appl. No.: 17/915,557

(22) PCT Filed: Apr. 23, 2020

(86) PCT No.: PCT/JP2020/017559
§ 371 (c)(1),
(2) Date: Sep. 29, 2022

(87) PCT Pub. No.: WO2021/214952
PCT Pub. Date: Oct. 28, 2021

(65) Prior Publication Data
US 2023/0135969 A1    May 4, 2023

(51) Int. Cl.
*G07F 17/32* (2006.01)
(52) U.S. Cl.
CPC ...... *G07F 17/3267* (2013.01); *G07F 17/3213* (2013.01); *G07F 17/3262* (2013.01)
(58) Field of Classification Search
CPC ............ G07F 17/3267; G07F 17/3213; G07F 17/3262
See application file for complete search history.

(56) References Cited

U.S. PATENT DOCUMENTS

| | | | |
|---|---|---|---|
| 9,401,076 B2 | 7/2016 | Nakamura | |
| 2003/0054874 A1* | 3/2003 | Kaminkow | G07F 17/32 463/20 |

(Continued)

FOREIGN PATENT DOCUMENTS

| | | |
|---|---|---|
| JP | 2005-237898 A | 9/2005 |
| JP | 2013-165902 A | 8/2013 |

(Continued)

OTHER PUBLICATIONS

International Search Report issued in PCT Patent Application No. PCT/JP2020/017559, Jul. 21, 2020, with English language translation, 5 pages.

*Primary Examiner* — James S. McClellan
(74) *Attorney, Agent, or Firm* — HAUPTMAN HAM, LLP (57) ABSTRACT

A game device comprises a control unit, a storage unit, and a display unit. The control unit executes a program in the storage unit for a game control method, including: displaying a spin image of a reel on the display unit; determining an additional number of wild symbols capable of being substituted for any symbol when a predetermined condition is satisfied when the reel stops spinning; determining a disposition position of the wild symbol in the display unit based on the determined additional number, and adding and disposing the determined additional number of the wild symbols on a plurality of stop symbols displayed on the display unit when the reel stops spinning, according to the determined disposition position; and updating data stored in the storage unit such that a dividend is given to a player according to a symbol displayed on the display unit after the addition and disposition.

9 Claims, 5 Drawing Sheets

(56) References Cited

U.S. PATENT DOCUMENTS

| | | |
|---|---|---|
| 2005/0192084 A1 | 9/2005 | Iwamoto |
| 2013/0217484 A1 | 8/2013 | Fujisawa et al. |
| 2018/0293936 A1 | 10/2018 | Fujioka |
| 2019/0051119 A1* | 2/2019 | San .................... G07F 17/3286 |
| 2019/0236904 A1* | 8/2019 | Meyerhofer ........ G07F 17/3295 |

FOREIGN PATENT DOCUMENTS

| | | |
|---|---|---|
| JP | 2017-018418 A | 1/2017 |
| WO | 2015/063941 A1 | 5/2015 |

\* cited by examiner

GAME DEVICE, GAME CONTROL METHOD, AND RECORDING MEDIUM

CROSS-REFERENCE TO RELATED APPLICATIONS

This application is the U.S. national phase of the International Patent Application No. PCT/JP2020/017559, filed Apr. 23, 2020, the entire content of which is incorporated herein by reference.

TECHNICAL FIELD

The present disclosure relates to a game device, a game control method, and a recording medium.

BACKGROUND

In order to enhance the fun of a game, various reel games (slot games) in which a bonus game can be played in combination with a normal game have been developed. For example, in U.S. Pat. No. 9,401,076, a bonus game, which performs a presentation, is disclosed in which when a bonus condition is satisfied in the normal game, a dragon appears in an area where the reel game is displayed, and the dragon randomly places one or more wild symbols (wild patterns) on the reels. Since the wild symbol can be substituted for any other symbol, a probability that a high dividend will be obtained depending on a result of the play is higher in the bonus game than in the normal game.

The bonus game disclosed in U.S. Pat. No. 9,401,076 is more interesting than the conventional reel game in that the dragon carries one or more wild symbols, but there was a problem that the number of wild symbols and final disposition positions of wild symbols carried by the dragon were difficult to understand, and the fun of the game was spoiled.

SUMMARY

The present disclosure has been made in view of the above, and an object of the present disclosure is to provide a technique for realizing a more interesting reel game.

A game device according to an embodiment is a game device comprising a control unit, a storage unit, and a display unit, in which the control unit is configured to execute a program stored in the storage unit to execute a display step of displaying a spin image of a reel on the display unit, a determination step of determining an additional number of wild symbols capable of being substituted for any symbol in a case where a predetermined condition is satisfied when spin of the reel is stopped, a disposition step of determining a disposition position of the wild symbol in the display unit based on the determined additional number, and adding and disposing the determined additional number of the wild symbols on a plurality of stop symbols which are displayed on the display unit when the spin of the reel is stopped, according to the determined disposition position, and an update step of updating data stored in the storage unit such that a dividend is given to a player according to a symbol displayed on the display unit after the addition and disposition.

According to the disclosed embodiments, it is possible to provide a technique for realizing a more interesting reel game.

BRIEF DESCRIPTION OF THE DRAWINGS

Various embodiments are illustrated in the drawings, in which.

DETAILED DESCRIPTION

Hereinafter, embodiments of the present disclosure are described with reference to the drawings. However, the embodiments described below are merely examples, and there is no intention of excluding the application of various modifications and techniques not specified below. That is, the present disclosure can be carried out by variously modifying each embodiment or combining each embodiment within a range not deviating from the gist thereof. Further, in the description of the following drawings, the same or similar parts are represented by the same or similar reference numerals. The drawings are schematic and do not necessarily match the actual dimensions and ratios. Even between drawings, there may be parts where the relationship and ratio of dimensions differ from each other.

Example of Hardware Configuration of Game Device

Figure 1:
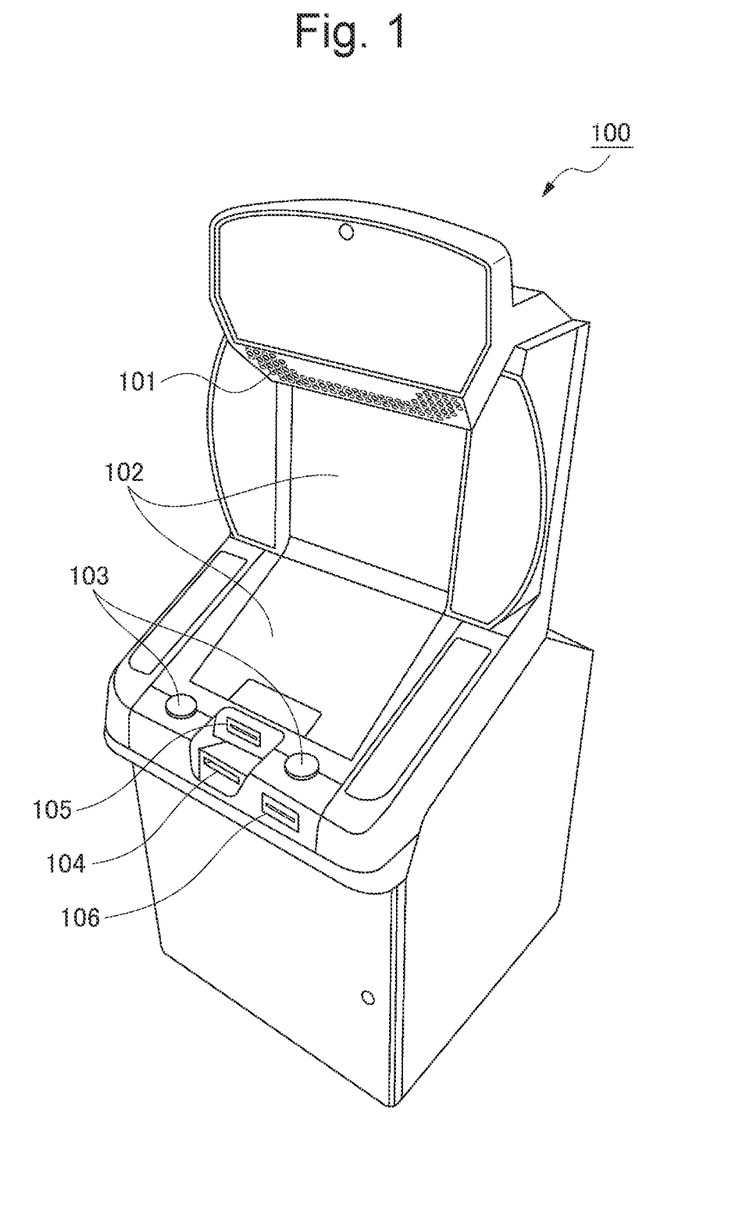
FIG. 1 is an external perspective view of a game device according to an embodiment.

FIG. 1 is an external perspective view of a game device according to an embodiment. A game device 100 illustrated in FIG. 1 is a game device installed in a casino, an amusement facility, or the like. In the present embodiment, the game device 100 allows a player to play a reel game (slot game).

As illustrated in FIG. 1, in appearance, the game device 100 comprises a speaker 101, a plurality of display devices 102, a plurality of operation buttons (hereinafter, referred to as "operation input device" 103), a card reading device 104, a bill insertion device 105, and a ticket payout device 106. The speaker 101 is acoustic output means for outputting game voice guidance, sound effects, and the like. The display device 102 is display means for displaying an image (for example, a still image, a moving image, a video, or the like) for presenting or directing a game. The operation input device 103 is configured of a plurality of buttons, and is a button for inputting an instruction from the player to the game device. Further, in the present embodiment, a touch panel as the operation input device 103 is provided integrally with the display device 102, and the touch panel can receive an operation instruction according to coordinates of a position where the player touches a display unit of the display device 102. The operation input device 103 is not limited to the above configuration, and may have any configuration as long as the player can input instructions. The card reading device 104 is a card reader that reads information from a card owned by the player. The bill insertion device 105 is a device for reading an inserted bill or ticket. The ticket payout device 106 is ticket output means for paying out the card to the player.

The card read by the card reading device 104 is a medium in which game information of the player is stored. The card can store, for example, information on addition or consumption of points acquired depending on a game situation of the player. The player can receive various services according to the information stored in the card, but the stored contents of the card do not affect a game result.

Further, the game device 100 comprises a computing device internally as a control device that collectively controls the game device 100.

Figure 2:
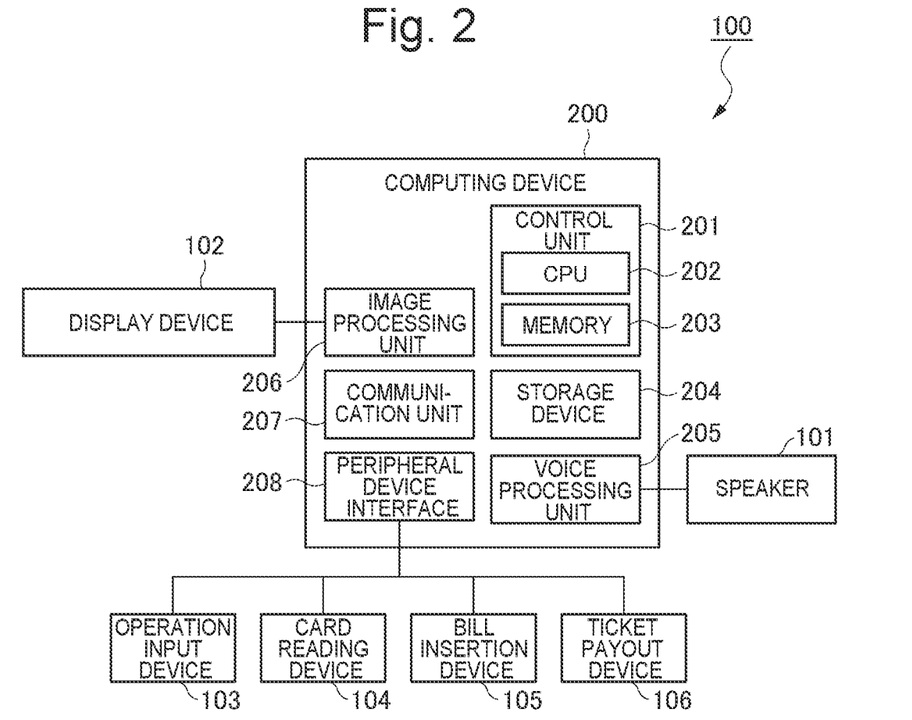
FIG. 2 is a block diagram illustrating a main hardware configuration of a game device according to an embodiment.

With reference to FIG. 2, an example of a hardware configuration of the computing device 200 provided inside the game device 100 is described. As illustrated in FIG. 2, the computing device 200 comprises, as a main hardware configuration, a control unit 201, a storage device 204, a voice processing unit 205, an image processing unit 206, a communication unit 207, and a peripheral device interface 208.

The control unit 201 comprises a CPU (Central Processing Unit) 202 and a memory 203. The computing device 200 controls processing and operations of other hardware configurations by, for example, a CPU 202 executing a predetermined computer program (for example, a game software program) stored in the memory 203, the storage device 204, or the like, and realizes various functions. That is, the computing device 200 realizes the game function in cooperation with other hardware by executing a predetermined computer program under the control of the control unit 201. FIG. 2 only illustrates the main configurations included in the computing device 200, and the computing device 200 also comprises other configurations included in a general information processing device.

The storage device 204 is configured by a hard disk, a semiconductor storage device, or the like. The storage device 204 reads and writes data by the control unit 201. In the storage device 204, data such as a computer program necessary for processing in the computing device 200 is written, and further, data of the processing result is written. The voice processing unit 205 performs various sound processing under the control of the control unit 201, and outputs the data of the processing result to the speaker 101. The image processing unit 206 performs various graphics processing under the control of the control unit 201, and outputs the data of the processing result to the display device 102. The communication unit 207 is an interface that enables communication with a server and other game devices. The peripheral device interface 208 is an interface that enables the computing device 200 to communicate with peripheral devices such as the operation input device 103, the card reading device 104, the bill insertion device 105, the ticket payout device 106, and the like.

Game Content Example

Next, an example of the content of the game that can be played by the player by the game device 100 of the present embodiment is described. The game device 100 expands and executes a computer program stored in the storage device 204 or the like on the memory 203 under the control of the control unit 201, and controls the operation of various configurations included in the game device 100, and thereby the game is realized.

First, in order to start the game, the player inserts his/her own card into the card reading device 104 of the game device 100, and inserts a bill or a ticket into the bill insertion device 105. When the bill or the ticket is inserted, the player can own a credit corresponding to the inserted bill and ticket in the game. In the present embodiment, the credit is a virtual currency that can be used in the game or the like.

Next, the game device 100 generates a bet screen for the player to bet on the reel game by the control unit 201 and the image processing unit 206, and displays the bet screen on the display device 102. The game device 100 starts the reel game according to the bet and start operation instruction by the player. A reel game that can be played by inserting the bill or the like, and charging in this way is referred to as a "normal game" in the following description. On the other hand, a reel game that can be played for free without charging is referred to as a "free game" in the following description.

In the normal game, first, the game device 100 displays an image, in which a plurality of virtual reels (for example, five reels. Hereinafter, the virtual reels are also simply referred to as the "reels") spin on the display device 102, and the spin is stopped at a random timing for each reel in the display. After the stop, a part of each reel is displayed on the display device 102.

Figure 3:
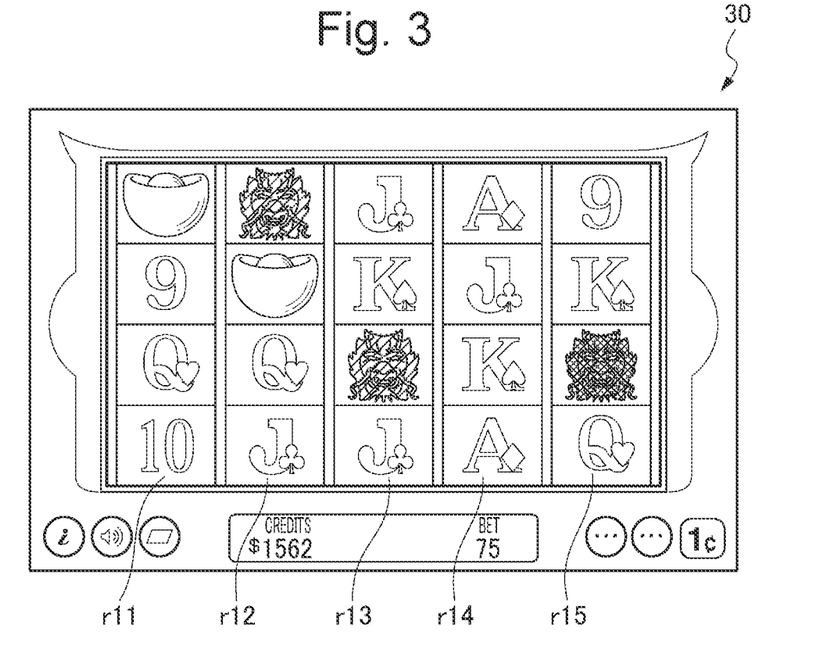
FIG. 3 is a conceptual view illustrating an example of a screen displayed on a display device according to an embodiment.

FIG. 3 illustrates an exemplary main image 30 displayed on the display device 102 when the spin of the reel stops in the normal game. The main image 30 is an image mainly referred to by the player during the play. In the main image 30, a part of each of the first reel r11 to the fifth reel r15 is displayed from the left.

Specifically, since four symbols are displayed per reel, a total of 20 (=4×5) symbols are displayed on the display device 102. The plurality of symbols attached to the reel include various kinds of symbols such as a symbol indicating a mark such as "J", a symbol indicating a number such as "9", and a symbol indicating a "dragon". Regarding the symbol indicating the "dragon" attached to the reel, four types of symbols colored in green, blue, purple, and gray can appear in the normal game.

Further, in the normal game, various benefits are given to the player depending on whether the arrangement of the symbols displayed on the display device 102 follows a preset (or selected) payline. That is, it is determined whether the player has elected (won) in the game according to the displayed symbol, and if the player has elected, a privilege according to the content of the election is given. As an example, in the normal game, when special symbols appear on the first reel r11 and the fifth reel r15 when the spin of the reel is stopped, a bonus game is activated. The bonus game is described in detail in the description of the free game illustrated below.

The free game is now described. For example, in a normal game, the game device 100 shifts to a state where the free game is playable when the disposition or type of the symbols displayed on the display device 102 when the spin of the reel is stopped satisfies a predetermined condition. After that, the player can play the free game continuously a predetermined number of times (for example, eight times). Even in the free game, various benefits such as high dividend can be obtained is given to the player depending on the arrangement of the symbols, the disposition of the predetermined symbols, or whether the predetermined number or more of the predetermined symbols are displayed after the spin of the reel is stopped.

For example, it is assumed that eight free games are shifted to the playable state under the condition that three or more symbols of a Taegeuk mark appear. After shifting to the playable state of the free game, the game device 100 starts the reel game as the free game according to an operation instruction to the game device 100 by the player.

In the free game, as in the normal game, first, the game device 100 displays an image in which a plurality of reels spin on the display device 102, and stops the spin at a predetermined timing for each reel in the display. After the stop, a part of each reel is displayed on the display device 102. In the free game, it is different from the normal game in that at least one of the four "dragons" attached to the reel, the "dragon" symbol (for example, the green "dragon" symbol) is changed to a wild symbol by lottery. Since the wild symbol is a symbol that can be substituted for any symbol, the player can advance the free game in an advantageous state.

Figure 4:
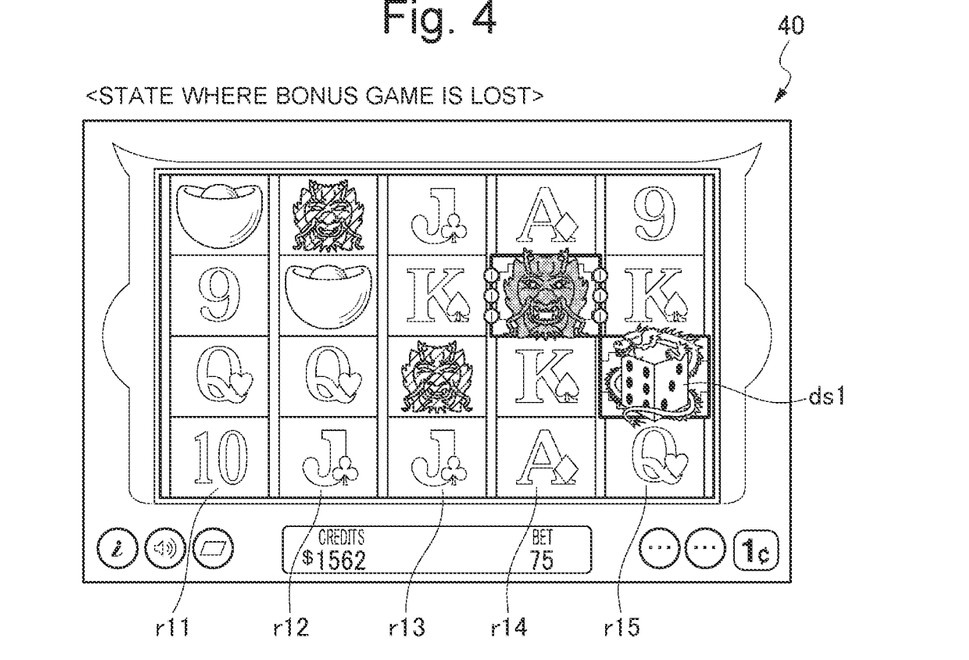
FIG. 4 is a conceptual view illustrating an example of a screen displayed on a display device according to an embodiment.
Figure 5:
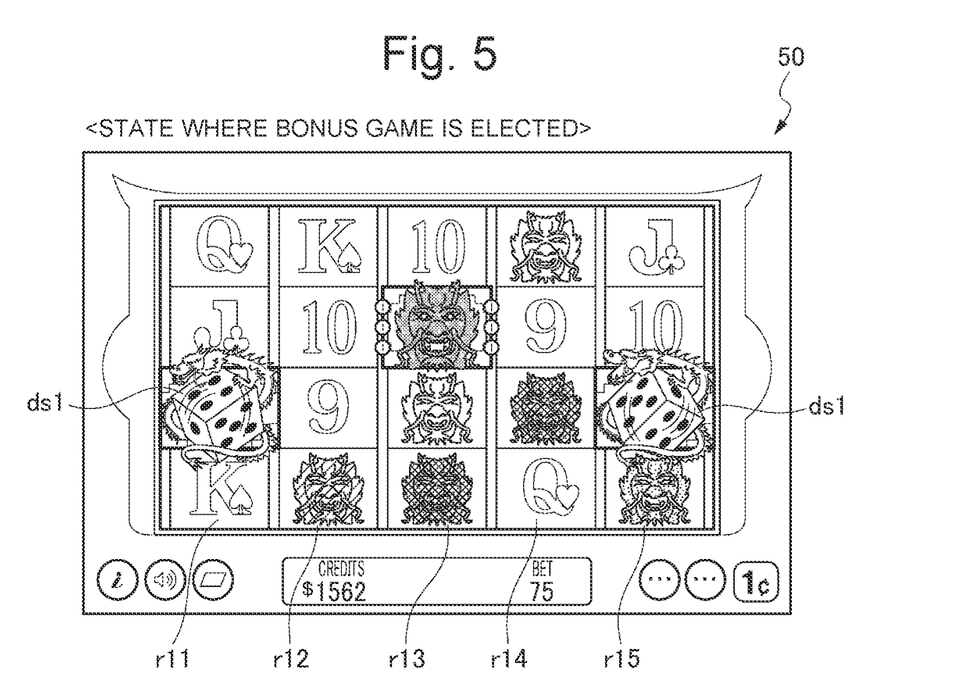
FIG. 5 is a conceptual view illustrating an example of a screen displayed on a display device according to an embodiment.

FIGS. 4 and 5 are views illustrating images displayed on the display device 102 when the reel is stopped in the free game, in which FIG. 4 illustrates a state where the bonus game is lost, and FIG. 5 illustrates the state where the bonus game is elected. When the disposition and type of the symbols displayed on the display device 102 when the reel is stopped satisfy a predetermined condition, the bonus game is activated. The predetermined condition for activating the bonus game is stored in the storage device 204. In the present embodiment, when the special symbol (specifically, a dice symbol indicating "dice") appears on both the first reel r11 and the fifth reel r15 when the reel is stopped, the bonus game is activated. In the main image 40 illustrated in FIG. 4, although a dice symbol ds1 appears on the fifth reel r15, the dice symbol does not appear on the first reel r11. In this case, the game device 100 determines that the bonus game is out of order, and the bonus game is not activated. On the other hand, in the main image 50 illustrated in FIG. 5, the dice symbol ds1 appears on both the first reel r11 and the fifth reel r15. In this case, the game device 100 determines that the bonus game has been elected, and activates the bonus game. When the bonus game is activated, the game device 100 performs presentation (that is, presentation of the dice lottery) to shake the dice displayed on the first reel r11 and the fifth reel r15 to determine an outcome.

Figure 6:
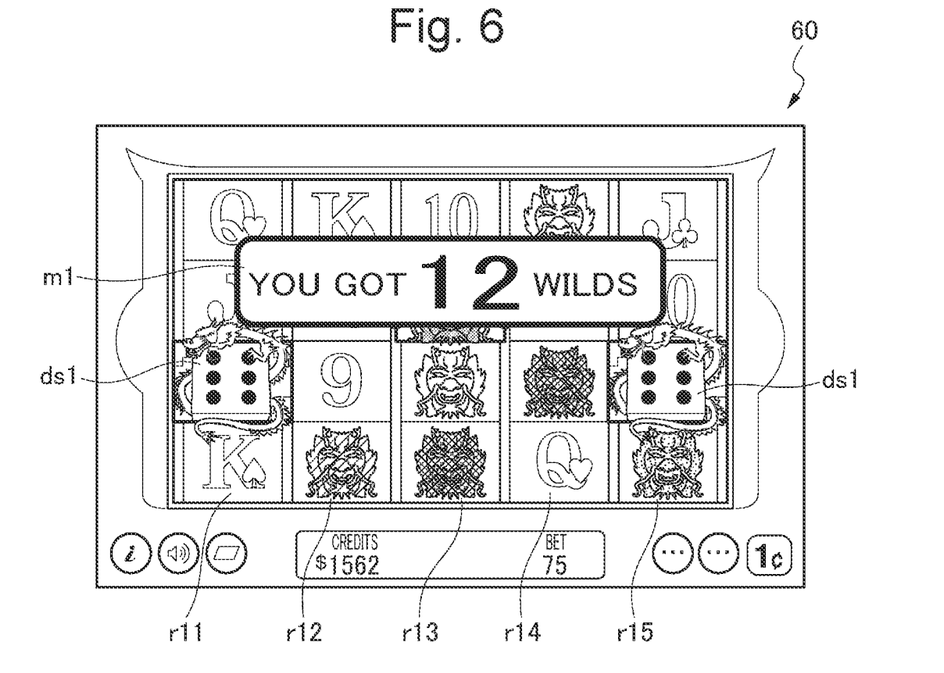
FIG. 6 is a conceptual view illustrating an example of a screen displayed on a display device according to an embodiment.

FIG. 6 is a view exemplifying an image illustrating the result of the dice lottery displayed on the display device 102 under the control of the control unit 201. In the main image 60 illustrated in FIG. 6, as a result of the dice lottery, the dice symbol ds1 having the outcome of "6" is displayed on both the first reel r11 and the fifth reel r15. In the present embodiment, the player is given a privilege such as adding wild symbols by the total number of outcomes of the two dice symbols ds1. In FIG. 6, since the total number of outcomes of the two dice symbols ds1 is "12" (=6+6), the message ml informing that the player has acquired the 12 wild symbols is displayed on the display device 12 in a substantially center thereof.

Figure 7:
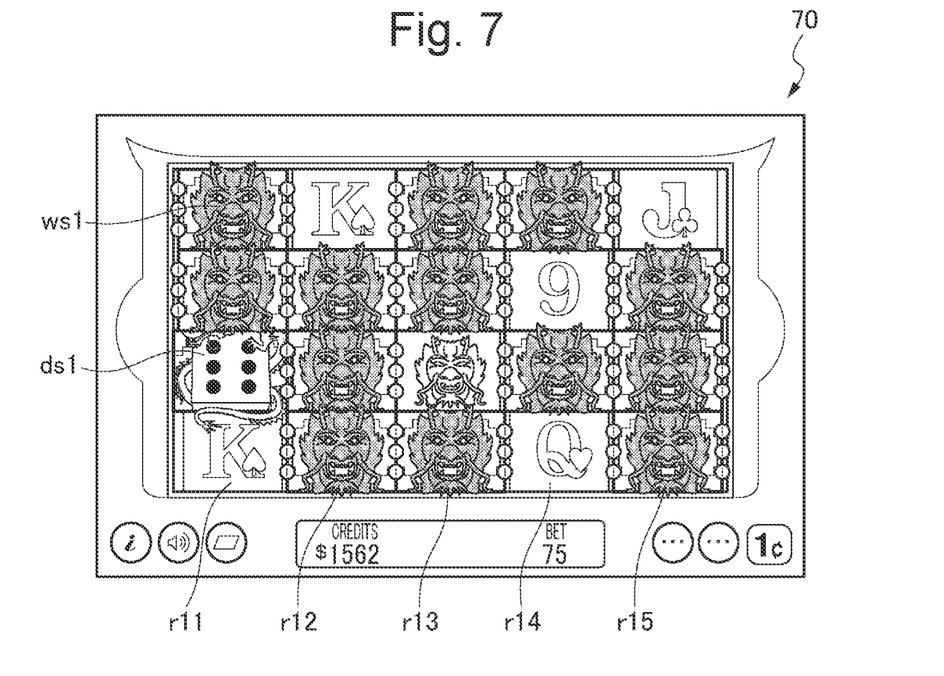
FIG. 7 is a conceptual view illustrating an example of a screen displayed on a display device according to an embodiment.

FIG. 7 is a view illustrating an image exemplifying an image illustrating a result of an additional disposition of the wild symbol ws1 displayed on the display device 102 under the control of the control unit 201. In the main image 70 illustrated in FIG. 7, twelve wild symbols ws1 acquired by the player by the dice lottery are added and disposed on the symbols (hereinafter, also referred to as "stop symbols") displayed when the reels are stopped. The disposition position of the wild symbol ws1 is determined by, for example, a random lottery. A program or the like for the random lottery is stored in the storage device 204.

In the present embodiment, the wild symbol ws1 may be added and disposed on any kind of stop symbol. That is, in addition to the symbol of the mark such as "J", the symbol of the number such as "9", the symbol of the "dragon" of each color, the wild symbol ws1 may also be added and disposed on special symbols such as the wild symbols and the dice symbols. As is clear by comparing FIGS. 6 and 7, in this example, the wild symbol ws1 is added and disposed on the dice symbol ds1 displayed in the third column of the fifth reel r15.

When the wild symbol ws1 is added and disposed, the control unit 201 determines whether the payline is established and the type of the payline based on the symbol displayed on the display device 102 after the addition and disposition, and performs the dividend according to the determination result. Information necessary for making these determinations and determining the dividend amount is stored in the storage device 204 as dividend reference information.

According to the present embodiment as described above, the spin image of the reel is displayed on the display device 102 under the control of the control unit 201, and then the spin of the reel is stopped. When the special symbol (dice symbol) appears on both the first reel r11 and the fifth reel r15 when the spin is stopped, the dice lottery is performed to determine the number of additional wild symbols. Further, the disposition position of the wild symbol to be added is determined by the random lottery or the like, and the wild symbol is added and disposed on the stop symbol according to the determined disposition position. Finally, the data stored in the storage device 204 is updated so as to give the player the dividend according to the symbol displayed after the addition and disposition.

Processing Flow

Figure 8:
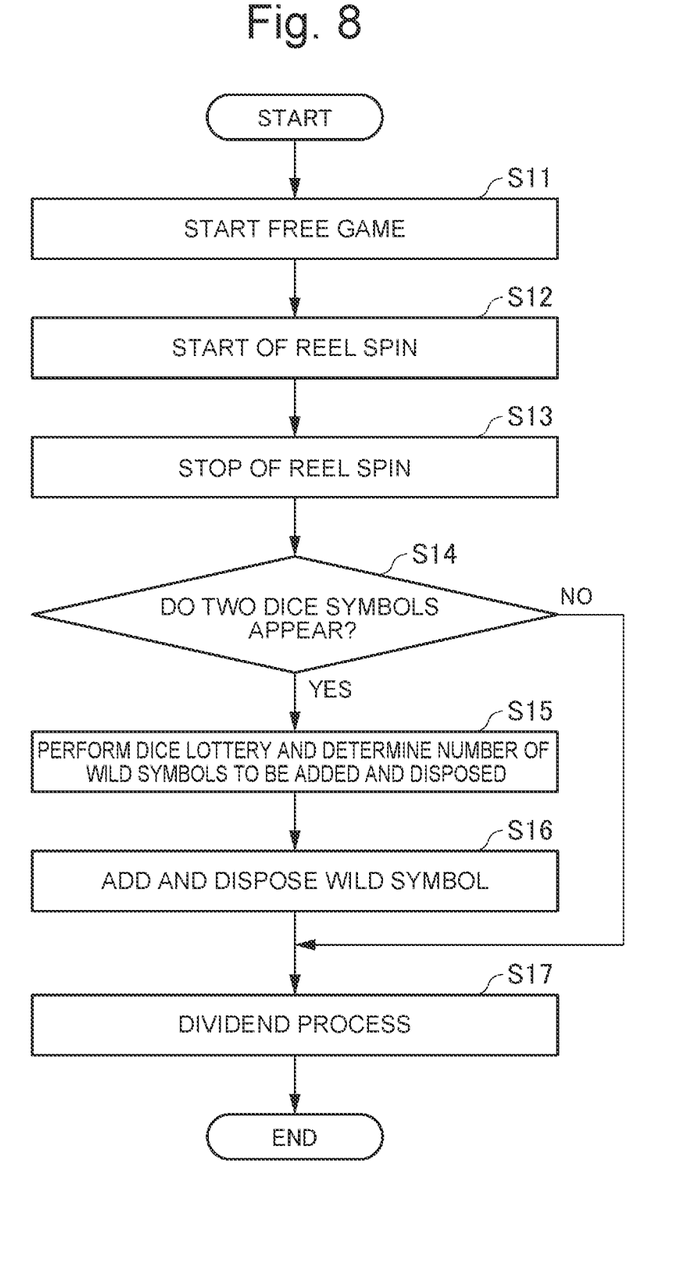
FIG. 8 is a flowchart describing a process by a game device according to an embodiment.

Next, with reference to FIG. 8, an example of a processing flow during the game play executed by the game device 100 is described.

This process is executed by the control unit 201 expanding the computer program stored in the storage device 204 or the like into the memory 203 and controlling hardware included in the game device 100, or the like. Each processing step included in the processing flow described below can be randomly changed in order or executed in parallel within a range that does not cause a contradiction in the processing contents. Further, other steps may be added between each processing step in a range that there is no contradiction in the processing contents. Further, the step described as one step for convenience can be executed by being divided into a plurality of steps, while the step described as being divided into a plurality of steps can be grasped as one step for convenience. Since the details of the process of each processing step have already been described, they are omitted here.

Further, this process start when the disposition and type of the symbols displayed on the display device 102 when the spin of the reel is stopped in the normal game satisfy a predetermined condition (for example, three or more symbols of the Taegeuk mark appear), and the free game is shifted to the playable state.

First, the control unit 201 starts the free game (step S11) and starts the spin of the reels (step S12). Specifically, the control unit 201 displays, on the display device 102, an image in which a plurality of reels where a plurality of symbols illustrated on the surface thereof spin based on the data read from the storage device 204. As a result, the symbols are sequentially displayed in each of the plurality of areas provided in the display device 102, and the display of the symbols in the plurality of areas is changed.

After that, the control unit 201 stops the change of the symbol display by stopping the spin of the reel in the image displayed on the display device 102 at a predetermined timing (step S13).

The control unit 201 determines whether two dice symbols (special symbols) have appeared in the specific area of the display device 102 when the spin of the reel is stopped (step S14). Specifically, the control unit 201 determines whether the dice symbol appears on both the first reel r11 and the fifth reel r15. When the two dice symbols appear, the control unit 201 determines that the bonus game has been elected, and proceeds to step S15. On the other hand, when the two dice symbols do not appear, the control unit 201 determines that the bonus game has been missed, and proceeds to step S17.

In step S15, the control unit 201 performs the presentation of the dice lottery and determines the number of wild symbols to be added and disposed. Specifically, the control unit 201 performs the dice lottery using two dice, and determines the total number of outcomes of each dice as the number of wild symbols to be added and disposed. An example of the presentation of the dice lottery in step S15 is described with reference to FIG. 6.

In step S16, the control unit 201 performs the presentation of adding and disposing the determined number of wild symbols on the stop symbol. Specifically, the control unit 201 determines the disposition position of the wild symbol by the random lottery, and added and disposes the wild symbol according to the determined disposition position. An example of the presentation of additional disposition is described with reference to FIG. 7.

In step S17, the control unit 201 grants the dividend to the player based on the final symbol display and the dividend reference information read from the storage device 204. Specifically, when the bonus game is activated (step S14: YES), the control unit 201 determines the establishment of the payline and the type of the payline based on the symbol display after the wild symbol is added and disposed in step S16 and the dividend standard information, and performs the dividend according to the determination result. On the other hand, when the bonus game is not activated (step S14: NO), the control unit 201 determines the establishment of the payline and the type of payline based on the symbol display after the spin of the reel is stopped in step S13 and the payout standard information, and performs the dividend according to the determination result. The control unit 201 updates the data stored in the storage device 204 so as to store the data of the given dividend according to the grant of the dividend.

As described above, according to the present embodiment, when the bonus game is activated, first, the number of wild symbols to be added and disposed by the dice lottery is determined, and then the determined number of wild symbols is randomly, and added and disposed on the stop symbol. The higher the number of wild symbols that appear, the higher the probability that the payline of a high dividend will be established, so the user can enjoy the process of additional disposition of the wild symbols in stages, and it is possible to gradually increase expectations for high dividend.

Modification Examples

The present disclosure is not limited to the above embodiments, and can be carried out with various other modifications without departing from the gist of the present disclosure. That is, the above embodiment is merely an example in every respect, and is not limitedly interpreted, and various modifications can be adopted.

In the above embodiments, when the control unit 201 determines that the dice symbol appears on both the first reel r11 and the fifth reel r15, the mode of starting the presentation of the dice lottery is exemplified (see step S14→step S15 illustrated in FIG. 8), but the purpose is not limited thereto. For example, when the control unit 201 determines that the dice symbol has appeared on both the first reel r11 and the fifth reel r15, and after that, the player gives an instruction to start the dice lottery (for example, a start button pressing operation, or the like), the presentation of the dice lottery may be started.

In the above embodiments, the dice lottery is performed using the virtual dice displayed on the display device 102, but instead thereof (or in addition thereto) the dice lottery may be performed by using the physical dice. Further, instead of the dice lottery, various lottery methods such as a lot lottery and a dart lottery may be used.

The number of dices used in the dice lottery is not limited to two. It may be one, or three or more. Further, the number of dices used in the dice lottery is not fixed, but may be variable according to the bet information (number of bets or the like). For example, when an extra bet is made by the player at the start of the game, the maximum number of dices that can appear may be changed from "2" to "3". Further, instead of the bet information, the game history or the like by the player may be used. For example, when the number of games played by the player exceeds a set threshold value, the maximum number of dices that can appear may be increased.

Further, in the above embodiments, in order to avoid duplicate explanations, the description has been made mainly on the case where the bonus game is activated in the free game, but as already explained, the same bonus game is activated in the normal game.

In the above embodiments, the mode in which the wild symbol is added when the bonus game is activated has been exemplified, but the purpose is not limited thereto.

Further, in the above embodiments, the disposition position of the wild symbol is determined by the random lottery, but the disposition position of the wild symbol may be determined, for example, based on the disposition rule stored in the storage device 204. As an example, there is a method of determining the disposition position (disposition pattern) based on the number of additional wild symbols, but the purpose is not limited thereto.

Further, in the above embodiments, the case where the wild symbol can be added and disposed on all kinds of stop symbols has been described, but the present disclosure is not limited to this. For example, if the stop symbol is the special symbol such as the wild symbol or the dice symbol, the additional disposition of the wild symbol may be prohibited.

Further, a program for realizing each embodiment of the present disclosure described above may be stored in a recording medium. Using this recording medium, the above program can be installed on a computer. Here, the recording medium in which the above program is stored may be a non-transient recording medium. The non-transient recording medium is not particularly limited, but may be, for example, a recording medium such as a CD-ROM.

LIST OF REFERENCE NUMERALS

100 Game device
101 Speaker
102 Display device
103 Operation input device
104 Card reading device 105 Bill insertion device
106 Ticket payout device
201 Control unit
202 CPU
203 Memory
204 Storage device
205 Voice processing unit
206 Image processing unit
207 Communication unit
208 Peripheral device interface

What is claimed is:

1. A game device, comprising:
a housing;
a display device incorporated in the housing, and having a display screen exposed on the housing;
a card reading device incorporated in the housing, having a slot for receiving a card inserted therethrough, and configured to read the card; and
a central processing unit (CPU) and a storage device in the housing, wherein the CPU is configured to execute a program stored in the storage device to execute:
causing the display device to display a plurality of reels on the display screen,
spinning the plurality of reels displayed on the display screen,
determining whether a plurality of stop symbols of the plurality of reels displayed on the display screen upon the spinning stopped includes at least one special symbol that satisfies a predetermined condition,
in response to the predetermined condition being satisfied, randomly determining a number of wild symbols each to substitute for one of the plurality of stop symbols displayed on the display screen,
substituting the number of wild symbols correspondingly for the same number of stop symbols among the plurality of stop symbols displayed on the display screen, and
updating data stored in the storage device to give a dividend to a player according to a combination of symbols displayed on the display screen as a result of said substituting,
wherein, in said substituting, at least one wild symbol substitutes for a stop symbol other than the at least one special symbol, and
wherein the CPU is configured to randomly determine the number of wild symbols by using virtual dice displayed on the display device, and the number of wild symbols is equal to a sum of indicia on top surfaces of the virtual dice.

2. The game device according to claim 1, wherein
the CPU is configured to randomly determine the number of wild symbols by using the virtual dice displayed on the display device, in response to an instruction input by the player after determining that the predetermined condition is satisfied.

3. The game device according to claim 2, wherein the CPU is configured to, according to bet information input by the player, change the number of virtual dice used to randomly determine the number of wild symbols.

4. The game device according to claim 1, wherein in the CPU is configured to randomly determine positions of the wild symbols in said substituting.

5. The game device according to claim 1, wherein
the at least one special symbol comprises two virtual dice which the CPU is configured to use to randomly determine the number of wild symbols.

6. The game device according to claim 5, wherein
the predetermined condition is satisfied in response to the two virtual dice occurring at predetermined positions upon the spinning of the plurality of reels being stopped.

7. The game device according to claim 5, wherein
at least one of the two virtual dice is not substituted in said substituting.

8. A game control method executed in a game device, the game device including:
a housing;
a display device incorporated in the housing, and having a display screen exposed on the housing;
a card reading device incorporated in the housing, having a slot for receiving a card inserted therethrough, and configured to read the card; and
a central processing unit (CPU) and a storage device in the housing, wherein the CPU is configured to execute a program stored in the storage device to execute the game control method,
the game control method comprising:
causing the display device to display a plurality of reels on the display screen;
spinning the plurality of reels displayed on the display screen;
determining whether a plurality of stop symbols of the plurality of reels displayed on the display screen upon the spinning stopped includes at least one special symbol that satisfies a predetermined condition;
in response to the predetermined condition being satisfied, randomly determining a number of wild symbols each to substitute for one of the plurality of stop symbols displayed on the display screen;
substituting the number of wild symbols correspondingly for the same number of stop symbols among the plurality of stop symbols displayed on the display screen; and
updating data stored in the storage device to give a dividend to a player according to a combination of symbols displayed on the display screen as a result of said substituting,
wherein, in said substituting, at least one wild symbol substitutes for a stop symbol other than the at least one special symbol, and
wherein the number of wild symbols is randomly determined by using virtual dice displayed on the display device, and the number of wild symbols is equal to a sum of indicia on top surfaces of the virtual dice.

9. A non-transitory, computer readable recording medium that stores a program for executing a game control method in a game device,
the game device including:
a housing;
a display device incorporated in the housing, and having a display screen exposed on the housing;
a card reading device incorporated in the housing, having a slot for receiving a card inserted therethrough, and configured to read the card; and
a central processing unit (CPU) and a storage device in the housing, wherein the CPU is configured to execute the program to execute the game control method,
wherein the game control method includes:
causing the display device to display a plurality of reels on the display screen;
spinning the plurality of reels displayed on the display screen;

determining whether a plurality of stop symbols of the plurality of reels displayed on the display screen upon the spinning stopped includes at least one special symbol that satisfies a predetermined condition;

in response to the predetermined condition being satisfied, randomly determining a number of wild symbols each to substitute for one of the plurality of stop symbols displayed on the display screen;

substituting the number of wild symbols correspondingly for the same number of stop symbols among the plurality of stop symbols displayed on the display screen; and updating data stored in the storage device to give a dividend to a player according to a combination of symbols displayed on the display screen as a result of said substituting, wherein, in said substituting, at least one wild symbol substitutes for a stop symbol other than the at least one special symbol, and wherein the number of wild symbols is randomly determined by using virtual dice displayed on the display device, and the number of wild symbols is equal to a sum of indicia on top surfaces of the virtual dice.

* * * * *